US007579700B1

(12) United States Patent
Meller

(10) Patent No.: US 7,579,700 B1
(45) Date of Patent: Aug. 25, 2009

(54) SYSTEM AND METHOD FOR CONVERTING ELECTRICAL ENERGY INTO PRESSURIZED AIR AND CONVERTING PRESSURIZED AIR INTO ELECTRICITY

(76) Inventor: Moshe Meller, 8 Balfur St., Tel Aviv 65213 (IL)

( * ) Notice: Subject to any disclaimer, the term of this patent is extended or adjusted under 35 U.S.C. 154(b) by 0 days.

(21) Appl. No.: 12/175,246

(22) Filed: Jul. 17, 2008

Related U.S. Application Data

(60) Provisional application No. 61/056,626, filed on May 28, 2008.

(51) Int. Cl.
*F02B 63/04* (2006.01)
*F02B 13/00* (2006.01)
*H02P 9/04* (2006.01)

(52) U.S. Cl. ............................ 290/43; 290/1 A; 290/54

(58) Field of Classification Search .................. 290/43, 290/54, 1 A, 1 R, 4 R; 60/415, 698, 398, 60/325, 327, 39.57, 646, 659, 657, 512, 39.01, 60/655, 39.182; 405/76
See application file for complete search history.

(56) References Cited

U.S. PATENT DOCUMENTS 2,647,370 A * 8/1953 Miller ....................... 60/39.57
3,677,008 A 7/1972 Koutz
3,895,493 A 7/1975 Rigollot
3,967,132 A * 6/1976 Takamine ................... 290/4 R
3,996,741 A 12/1976 Herberg
4,086,765 A * 5/1978 Gillilan ....................... 60/325
4,211,077 A 7/1980 Cassidy
4,528,811 A * 7/1985 Stahl ........................... 60/784
4,660,379 A 4/1987 Lane
4,757,960 A * 7/1988 Paris et al. ................. 244/3.22
5,074,710 A 12/1991 Gorlov
5,903,060 A * 5/1999 Norton .......................... 290/2
7,127,895 B2 * 10/2006 Pinkerton et al. ............. 60/646
7,281,371 B1 10/2007 Heidenreich
2005/0212298 A1 * 9/2005 Yeh ............................ 290/1 A

FOREIGN PATENT DOCUMENTS

JP 03164503 A * 7/1991

* cited by examiner

*Primary Examiner*—Julio Gonzalez
(74) *Attorney, Agent, or Firm*—Frishauf, Holtz, Goodman & Chick, P.C.

(57) ABSTRACT

A system for converting electricity into pressurized air, and converting pressurized air into electricity. The system includes a pressurized air reservoir, two high pressure tanks, a pump and an electrical motor convertible into a hydro turbine and an electricity generator, a volume of water equal to a tank's volume, a set of controllable valves for connecting and disconnecting independently each tank, to the atmosphere, to the pump inlet and outlet, and to the air reservoir. In use, a volume of water in the first tank is pumped into the second tank, the air in the second tank is compressed and flows into the air reservoir. By changing position of the valves, the operation repeats with opposite roles of the tanks. In an electricity generating mode, the system operates by transferring pressurized air from the air reservoir into the first tank which is full of water, the pressurized water flowing through the hydro turbine generator thereby generating electricity.

16 Claims, 8 Drawing Sheets

SYSTEM AND METHOD FOR CONVERTING ELECTRICAL ENERGY INTO PRESSURIZED AIR AND CONVERTING PRESSURIZED AIR INTO ELECTRICITY

CROSS REFERENCE TO RELATED APPLICATION

This application claims priority of U.S. provisional patent application Ser. No. 61/056,626 filed May 28, 2008, the entire contents of which are incorporated herein by reference.

FIELD OF THE INVENTION

The field of the invention is energy storage, by pressurized air, in a way that the energy will be stored as pressurized air at a time of high production and low demand, and will be delivered as electricity at a time of high demand.

BACKGROUND OF THE INVENTION

It is well known that the economical value of energy that can be supply at the time of peak consumption is very high. It is also very important at this time of high investments in renewable energy systems of all kinds, to be able to store the produced energy, as the renewable energy is not correlated with the demands. For example, solar energy that can produce electricity in daytime, can be required mostly during dark hours. Many systems and methods for energy storage have been developed. Some of these systems are: pump water into high elevated reservoirs and then release the water through hydro generators; and direct pressurized air into deserted mines or into submersible inflatable tanks on the ocean floor and release the pressurized air through hydraulic motors or turbines which drive generators. These systems and others have disadvantages like: energy losses during the conversion process, and the water reservoirs take a lot of land and they are expensive to build. Others systems are very limited in the amount of energy that they can store, and the stored energy is dissipating over time. The pressurized air systems are amongst the most promising energy storage systems, however, the existing process for compressing air are very inefficient. Also converting pressurized air back to electricity using the existing systems and methods is a complicated and inefficient process. The need for a system and a method that can convert electricity to pressurized air and pressurized air to electricity, everywhere in all ground condition, is very clear and present.

OBJECTS OF THE PRESENT INVENTION

The object of the present invention is to provide a system and a method for compressing air in very high volumetric capacity at a very high efficiency to be stored in a high volume high pressure reservoir. Achieving the above when the compressing air system is compact, easy to build, to install and to maintain is another object of the invention.

Another object of the invention is to provide an air compressing system that can be converted into and can be used as a generator that can convert the pressurized air energy into electricity, at a very high efficiency. Another object of the present invention is to provide a system and a method that would convert pressurized air energy into electricity at a high level of efficiency, be easy to build and to maintain, be connected to the grid instantly, and supplies needed electricity power.

SUMMARY OF THE INVENTION

The present invention comprises a pressurized air storage reservoir, at least two tanks that can contain pressurized air at a higher pressure than the pressure in the pressurized air storage reservoir, and a high volume high pressure reversible hydro-generator-pump like Francis type pump, the reversible hydro-generator-pump unit will operate as electrical motored-pump when electricity supply to the motor section, and will operate as electricity hydro-generator when high pressure water is flowing through the hydro turbine (pump) section. These types of units are well known in the industry and the GE Francis reversible hydro generator is just example of one of them. The efficiency of such units is more than 90%. The system also comprises valves that connect and disconnect the inner volume of each of the tanks independently to the inlet and to the outlet of the pump, to the open atmosphere and to the pressurized air reservoir.

At the starting phase of the operation, the second tank is full of water and open to the outside atmosphere and the lower portion of this second tank is connected to the inlet of the pump, the first tank is sealed to the atmosphere and the lower portion of this first tank is connected to the outlet of the pump. The pump starts pumping water into the first tank so that the water is filling the first tank while the air above the water is pressurized as the water flows into the first tank. At a certain point of operation, the air pressure in the first tank reaches the same pressure level of the pressurized air reservoir, and at this time, a valve is opened and connects the pressurized air in the first tank with the pressurized air in the storage, as the pump continues to fill the first tank with water, pressurized air is passing from the first tank into the pressurized air storage. When the first tank is almost filled with water, all the air that used to be in this first tank is now pressurized in the pressurized air reservoir. At this phase, the valve that connects the pressurized air reservoir with the first tank is disconnected and the first tank is opened to the atmosphere, and also at this phase, the second tank which is now practically empty from water will be disconnected from the open atmosphere, the inlet of the pump will be connected to the lower portion of the first tank, and the outlet of the pump will be connected to the lower portion of the second tank and the cycle that is described above will repeat with the two tanks having opposite roles.

The pressurized air can be used at any time of high demand to drive a gas turbine and generators by itself or in combination with firing natural gas mixed with the pressurized air, into the gas turbines that can drive generators. These possibilities are well known in the industry and they have disadvantages. The gas turbines are expensive to build and to maintain, the bottleneck in the ability to produce electricity is frequently the capacity of the gas turbines.

As stated before, one object of the present invention is to provide a system and a method that can convert pressurized air from pressurized air energy storage into electricity, in high power capacity efficiently, a system that would be easy to build and to maintain, and a system that can connect instantly to the electricity grid and that would be environment friendly.

The method of doing so is by operating the system for compressing air that is described above as a reciprocal hydro generator.

In this part of the present invention, the pump from the reversible hydro-generator-pump that described above will be used as a hydro turbine and the electrical motor that drove the pump previously will now be used as electricity generator. These changing of roles of pumps and motors to hydro turbines and generators respectively, are well known in the industry and can be ordered as standards sub systems. But it is possible to use an independent hydro generator turbine in this process instead of using the reversible hydro-generator-pump. The advantages of using the reversible type unit is saving in the investment that is needed, but when the hydro generator is needed in a remote location from the air compressor, there is no reason to use the reversible type hydro-generator-pump, and a regular hydro turbine generator will be used.

At the initial phase of the operation, the second tank is filled with water, disconnected to the atmosphere; and the lower portion of this second tank is connected to the inlet of the turbine. The first tank is filled with air and connected to the open atmosphere; and the lower portion of this first tank is connected to the outlet of the turbine. The operation is started when the valve that connects the pressurized air reservoir to the second tank is opened and pressurized air starts flowing into the upper portion of the second tank, the pressurized air is pressing the water in this tank, and the pressurized water is driving the hydro-turbine-generator which converts the energy of the water into electricity by rotating the generator. At this phase of the operation, the water in atmospheric pressure is flowing from the outlet of the hydro turbine into the first tank. When about 10% of the volume of the second tank is filled with pressurized air, the valve that connects the pressurized air reservoir to the second tank is disconnected. The pressurized air in the sealed inner volume of the second tank continues to expand and to press the water in the inner volume of the second tank; the water continues to flow through the hydro turbine-generator into the first tank. When the second tank is practically empty of water, the valve is opened and connects the second tank inner volume to the open atmosphere. At this point of time, some pressurized air is released from the second tank to the atmosphere, in this case this released pressurized air, contained about 10% from the energy that was taken from the pressurized air reservoir; it has to be noticed that the other 90% of the energy that has been taken from the pressurized air reservoir, and has been used to drive the turbine and the generator. Now the first tank is filled with water and will be disconnected from the open atmosphere, the lower portion of the first tank will be connected to the inlet of the hydro turbine by changing valve positions. The second tank is opened to the atmosphere, and the lower portion of the second tank will be connected to the outlet of the hydro turbine. At this phase, the pressurized air reservoir is connected to the upper portion of the first tank and the operation repeats, with opposite roles of the tanks.

It is important to understand the following points:

The volume of the pressurized air reservoir is large compared to the two other tanks, therefore during cycles of operation, the pressure in the pressurized air reservoir is practically constant.

The volume of the first and the second tanks of the system are large relative to the pump volumetric capacity, therefore the time of each cycle is relatively long.

If, for example, the volume of the two tanks is 10,000 cubic meters each and the volumetric capacity of the pump is 100 cubic meters/second and the pressure of the pressurized air reservoir is 32 bars, in this case, the time of air compressing cycle is about 100 seconds.

Because of the high efficiency of the water pump, and the fact that the system is working reciprocally on the same volume of water, and the long time of each cycle that causes a relatively low increase of air temperature, and the fact that at the compressing cycle the valve to the pressurized air storage is opened just when the pressure is practically equal in the tank of the compressing air and in the pressurized air reservoir, the process is very efficient.

The total efficiency of the air compressing by the system of the present invention can be better than 90%. The total efficiency of the electricity generating from pressurized air, by the system of the present invention can be better than 80%.

DETAILED DESCRIPTION OF THE INVENTION

Figure 1:
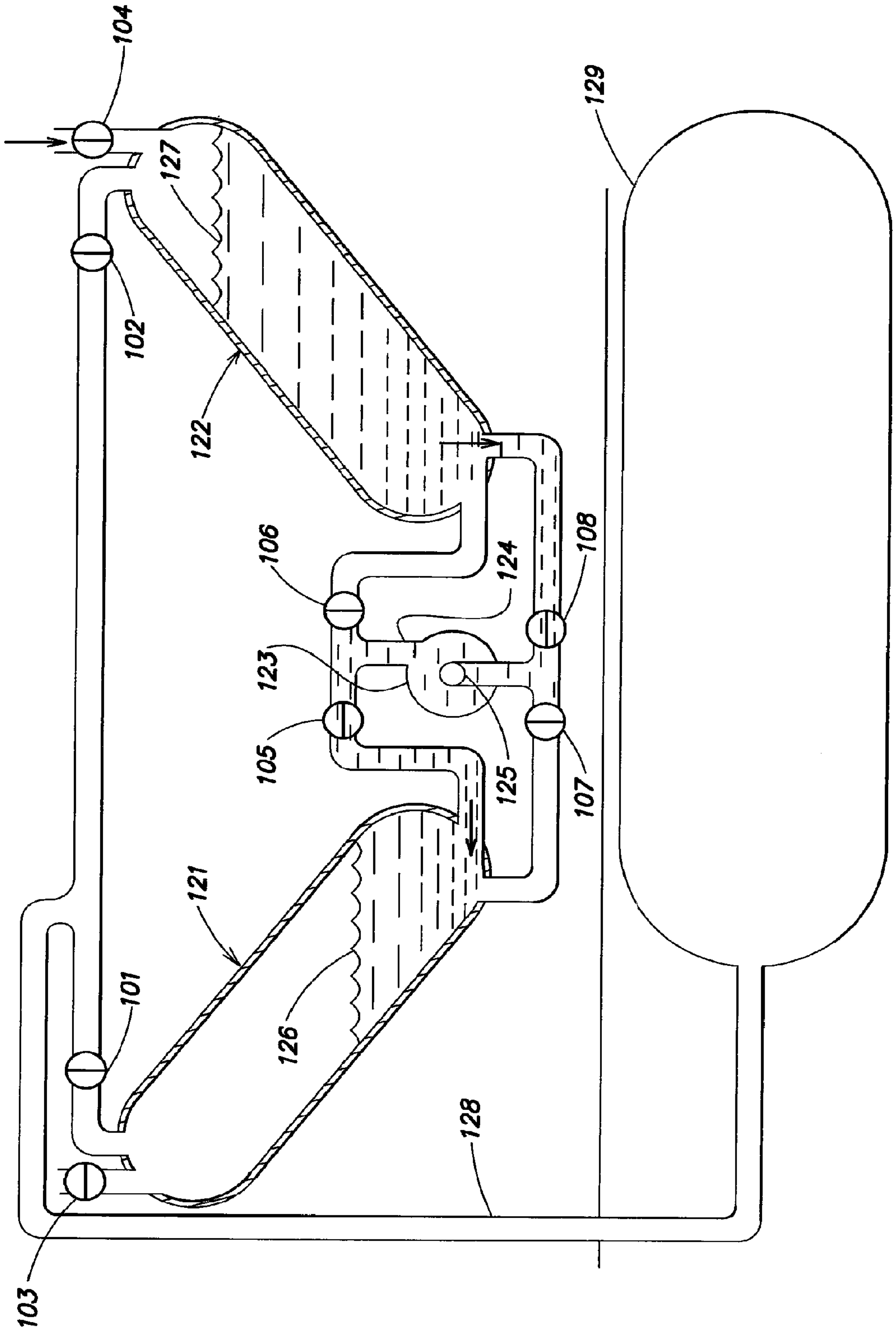
FIGS. 1, 2, 3 and 4 show the system of the present invention in four phases of air compressing mode.

In FIG. 1, reference numeral 129 is the pressurized air reservoir that is filled with pressurized air. Reference numerals 121 and 122 are tanks that can stand inner volume pressure, higher than the pressure of the pressurized air in the reservoir 129. Reference numerals 103 and 104 are two valves that can connect and disconnect the inner volume of tanks 121 and 122 respectively, to the open atmosphere. Reference numerals 101 and 102 are two valves that can connect and disconnect the pressurized air reservoir 129 to the inner volume of tanks 121 and 122, respectively. Reference numeral 128 is a conduct pipe that connects the two tanks 121, 122 to the reservoir 129. Reference numeral 123 is a high volume high pressure water pump, this pump is driven by an electrical motor (not showing in the drawings), the pump-motor assembly can operate as hydro turbine and electricity generator, this type of assembly is known to those who skilled in the field as reversible pump-hydro-generator-turbine. Reference numeral 124 is the outlet of the pump, reference numeral 125 is the inlet of the pump, reference numerals 105 and 106 are valves that connect and disconnect the outlet of the pump to the inner volume of tanks 121 and 122, respectively. Reference numerals 107 and 108 are valves that connect and disconnect the inlet of the pump to the inner volume of the tanks 121 and 122, respectively. Reference numerals 126 and 127 are the water levels in tanks 121 and 122, respectively.

Description of the Air Compressing Method by the System of the Present Invention:

First phase is shown in FIG. 1, in this phase, tank 122 is filled with water valve 104 is opened to the atmosphere, valve 102 is closed, valve 106 is closed, and valve 108 at the lower portion of tank 122 is opened and connects the water in tank 122 to the inlet of pump 123, valve 107 is closed, valve 105 is opened and connects the outlet of pump 123 to the lower portion of tank 121. The pump 123 is operating by the electrical motor, pumping the water from tank 122 into tank 121, as valves 107, 103, and 101, are closed, the volume of the air in the inner volume of tank 121 is decreasing with raising water level 126, and the pressure of air in tank 121 is increasing (this phase of the cycle continuing until the pressure of the air in tank 121 is equal to the pressure of the air in the pressurized air reservoir 129).

Figure 2:
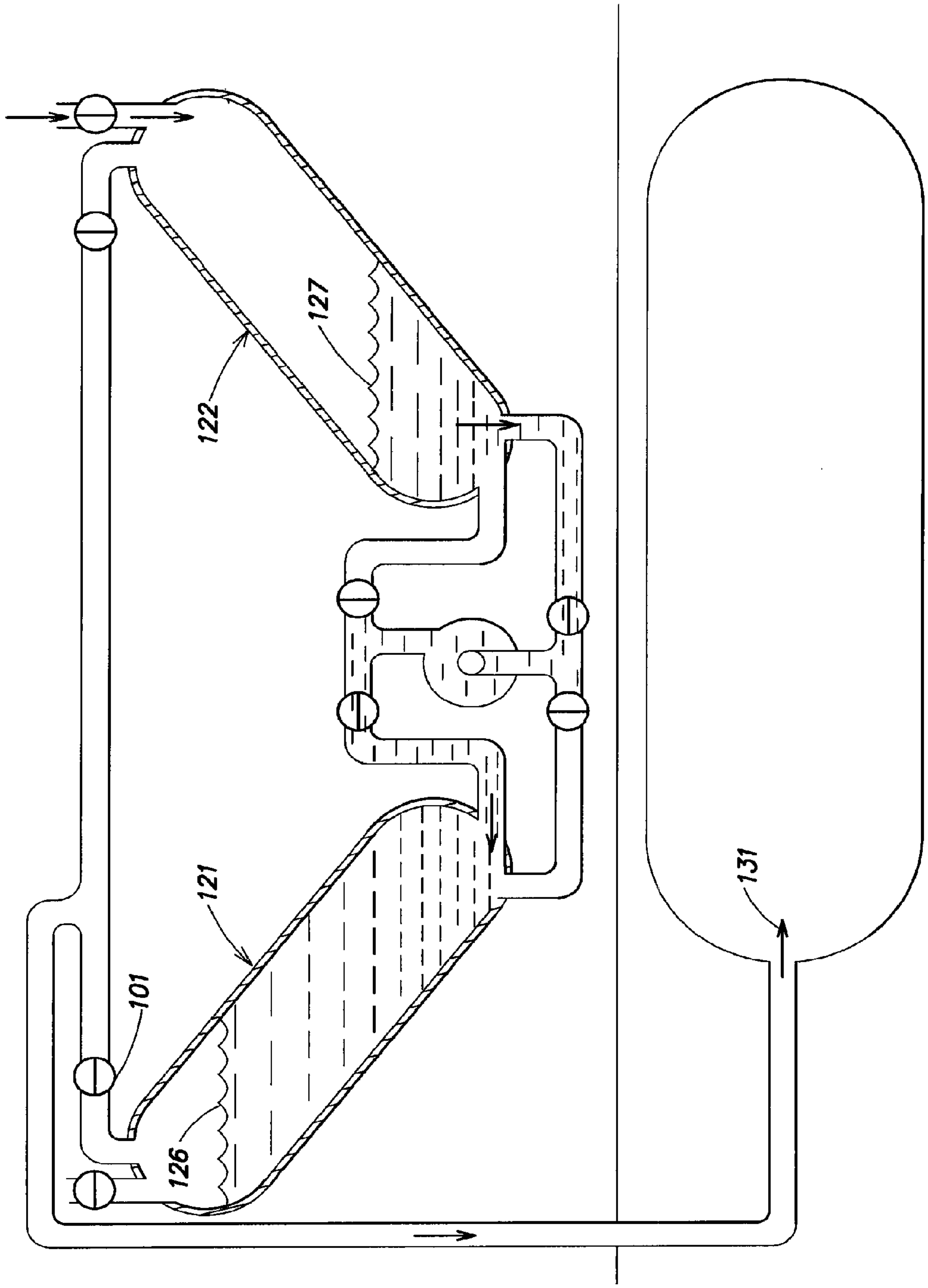

Second phase is shown in FIG. 2, in this phase, all valves remained in the position as in the first phase, except valve 101 which is opened and lets the continuing pressurized air pass from tank 121 into the pressurized air reservoir 129 through the conduct pipe 128. This second phase of the cycle continues until approximately all the air in the inner volume of tank 121 has been passed into the pressurized air reservoir 129.

Figure 3:
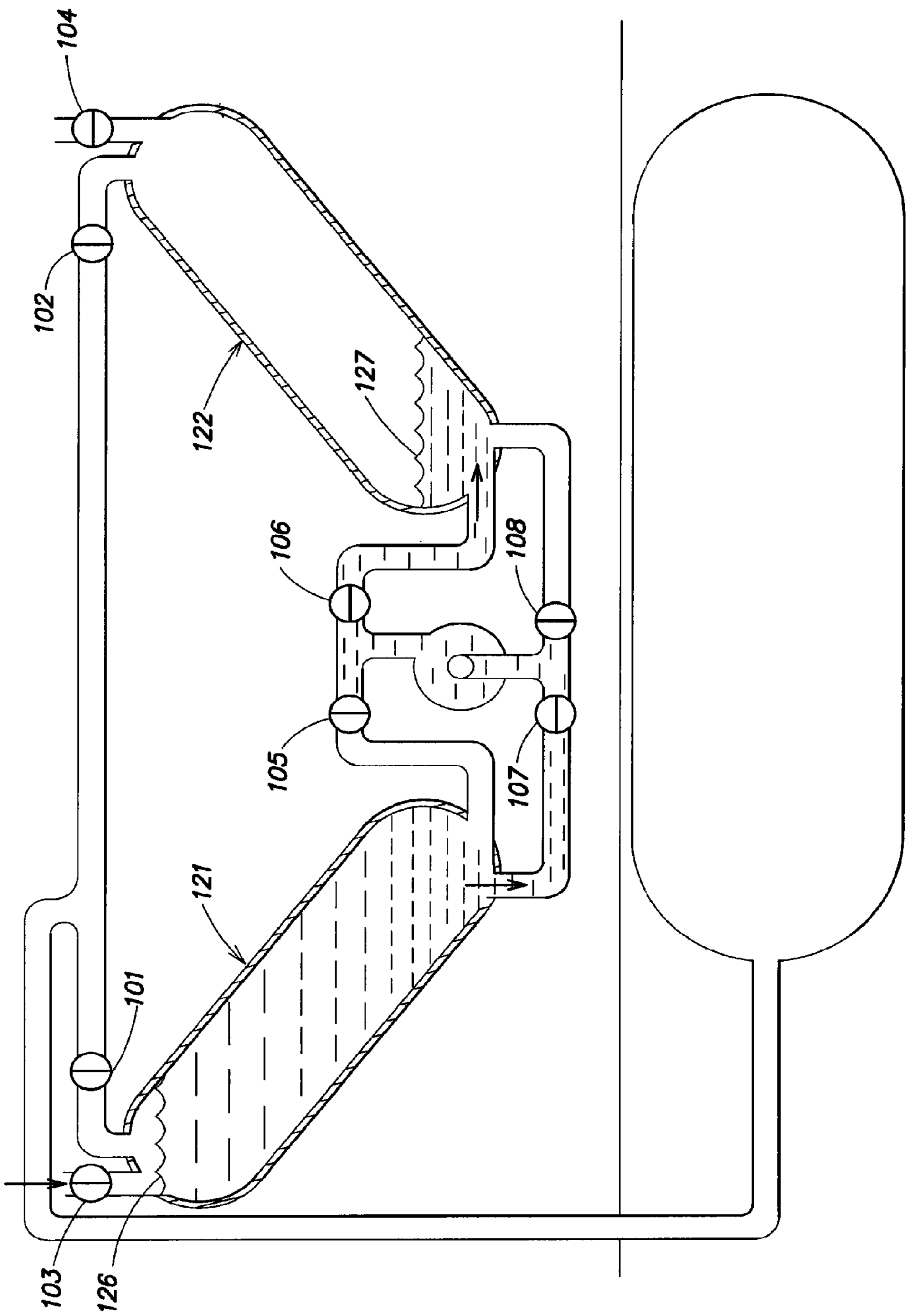

Third phase is shown in FIG. 3. This phase is practically identical to the first phase, with opposite roles of the tanks 121 and 122. In this phase, valve 103 is open to the atmosphere, tank 121 is filled with water, the pump is pumping the water from 121 into 122 through valves 107 and 106, the valves 102 and 104 are closed and the pressure of the air in the inner volume of tank 122 is increasing as the volume of air in the tank 122 is decreasing by the raising water level 127, this phase continuing until the pressure of the air in the inner volume of 122 is equal to the air pressure in the reservoir 129.

Figure 4:
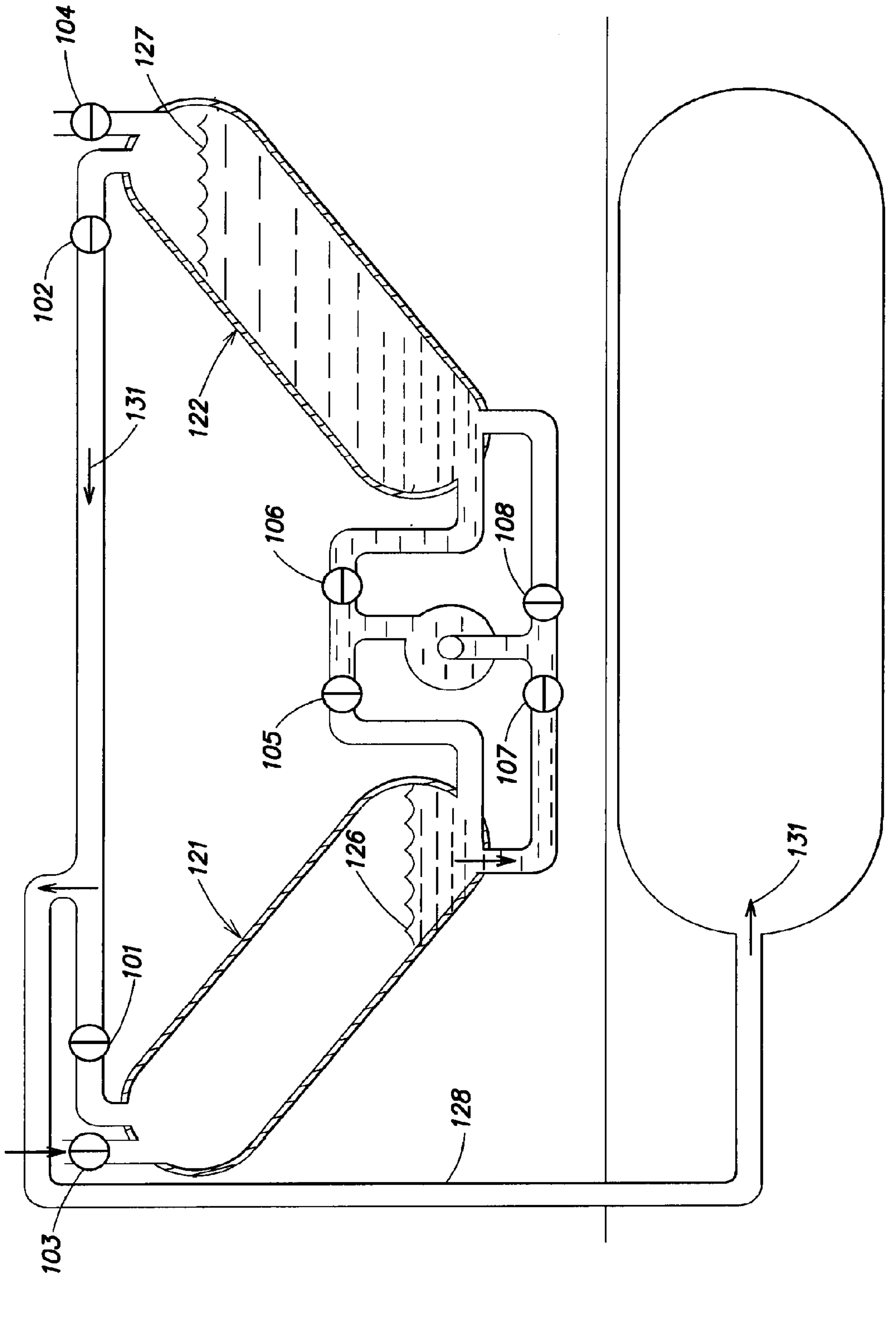

Fourth phase is shown in FIG. 4, all valves remained in the same position as in the third phase, except valve 102, which is now opened and lets the air 131 to pass from tank 122 into the pressurized air reservoir 129, through conduct pipe 128. This phase will continue until approximately all the air from tank 122 has been passed into the reservoir 129.

Important points in reference of the above description:

The connection between the two bodies of air in the pressurized air reservoir and in the tanks compressing air in phases 2 and 4 are made when the pressure of these two bodies of air is practically equal so that as a result, a sudden expansion of air is avoided and the efficiency of the system improved;

The system of this invention is using the same volume of water continuously, by that, significant amount of the heat which developed by compressing the air is passed to the water of the system, and to the air of the next cycles, thereby improving the system efficiency. This heat transfer can be improved by passing the air in the conduct pipe 128 through the water in tanks 122 and 121.

The water of the system that described above can be replaced by other liquids, mediums such as oil and the like.

Even though the system of the present invention meant to solve mainly the problem of compressing high volume of air for energy storage, the same invention can be used in places when a high volume of pressurized air is needed.

The pressurized air reservoir 129 can be any sealed volume such as man-made reinforced concrete reservoir, steel reservoir, underground space such as deserted salt mines, it can be a submersible flexible reservoir when the water pressure can give the pressure support to the inner pressure.

Figure 5:
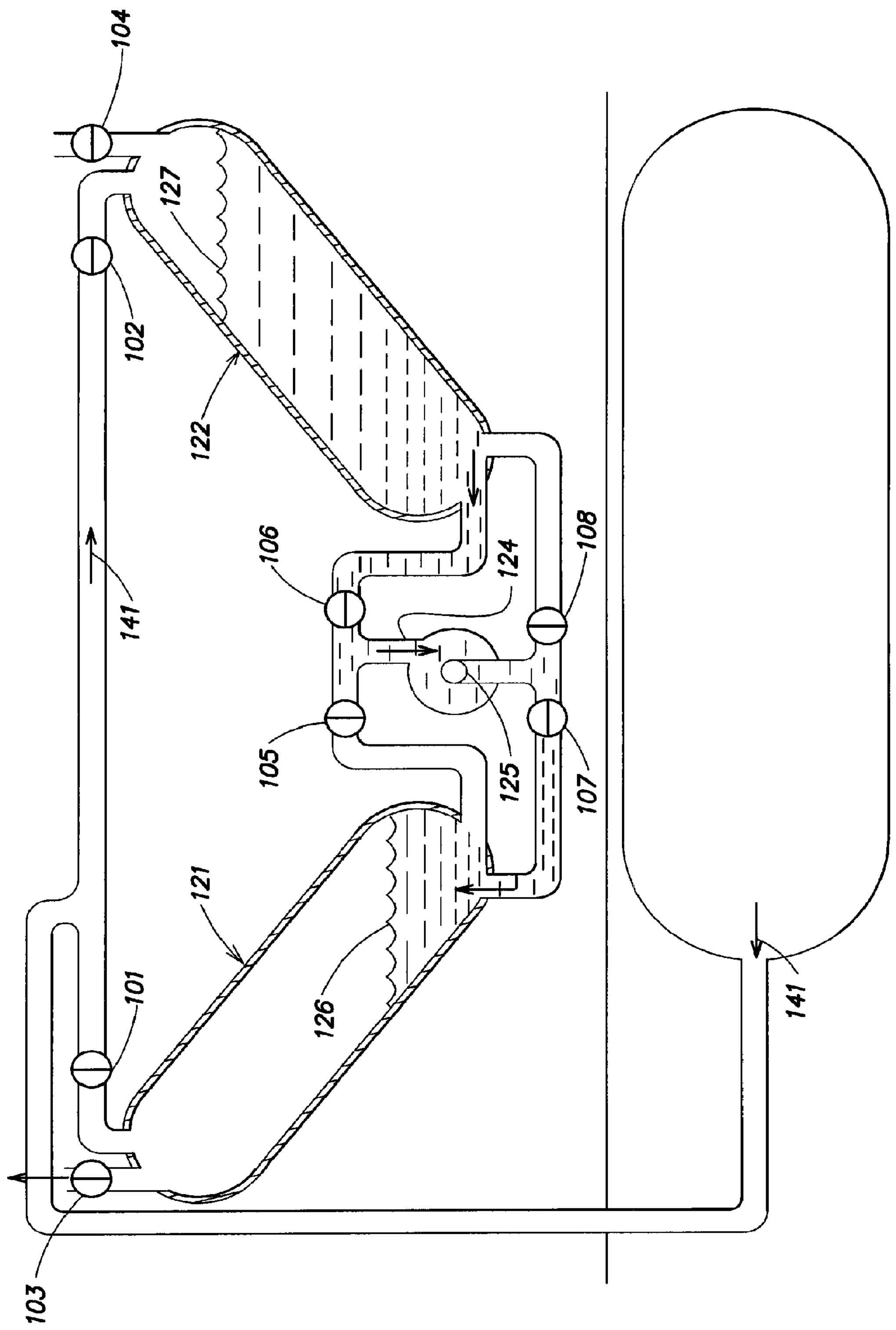
FIGS. 5 and 6 show the system of the present invention in two phases of electricity generating mode.
Figure 6:
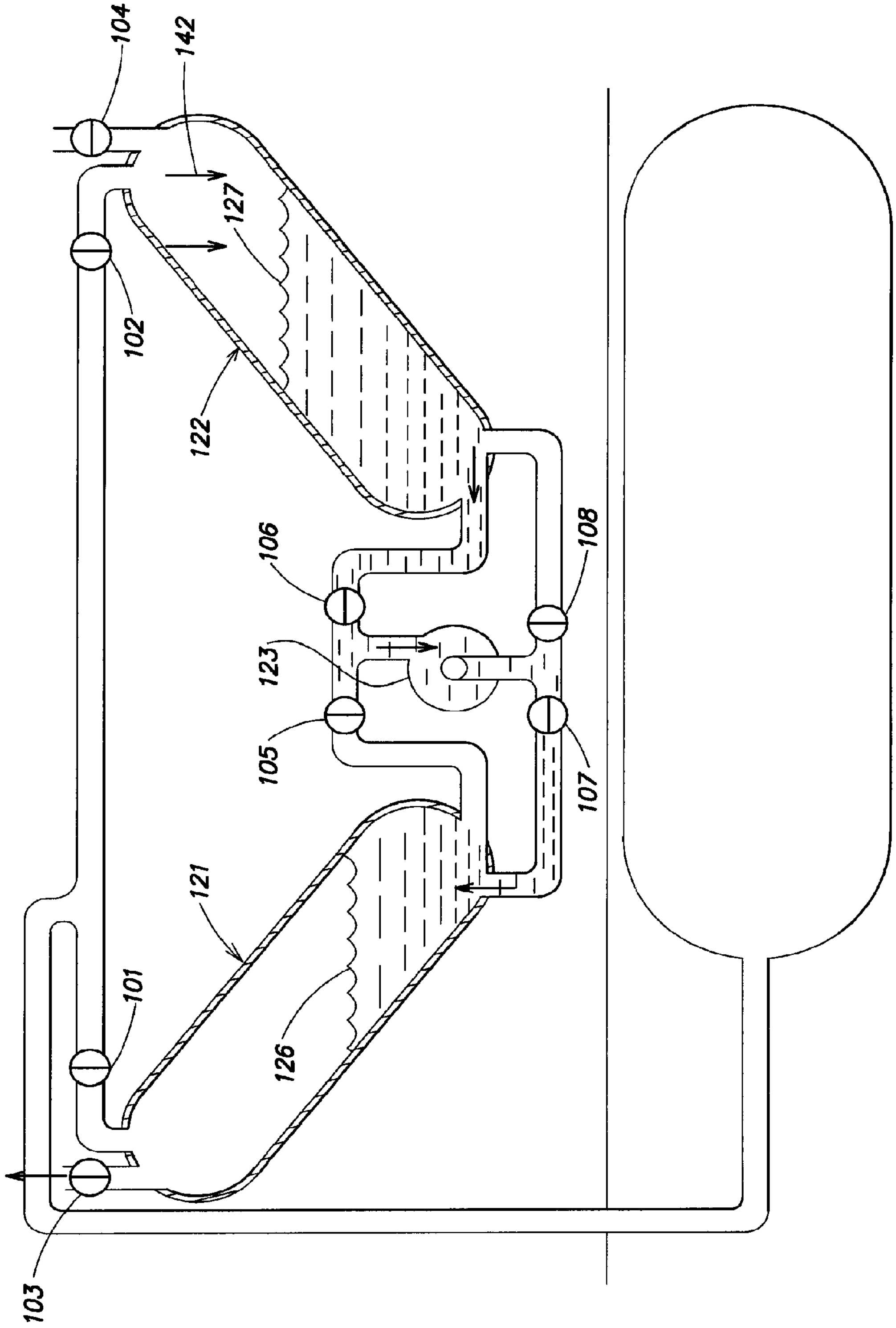

FIG. 5 and FIG. 6 are drawings showing the system of the present invention in a mode of converting the pressurized air energy into electricity.

In this mode, the pump 123 is converted into a hydro turbine, the electrical motor that drove the pump in the previous mode is converted into a generator. Reference numeral 124 is the inlet of the turbine in this mode and reference numeral 125 is the outlet of the turbine in this mode.

The first phase of this mode described in FIG. 5, tank 122 is practically filled with water and tank 121 is practically empty, valve 102 is opened and allows the pressurized air 141 from the energy storage 129 to pass into tank 122, valve 103 is opened and connects the inner volume of tank 121 to the open atmosphere, valves 101, 104, 105, and 108 are closed. The water in tank 122, pressurized by the air 141, is flowing from the lower portion of 122 through valve 106 into the inlet 124 of the hydro turbine 123, the turbine driven by the pressurized water rotates and drives the generator, which produces electricity, the water flowing through the outlet of the turbine 125 and through the valve 107 into the lower portion of the tank 121. This phase will continue until about 10% of the volume of tank 122 is filled with pressurized air.

FIG. 6 shows the second phase of this mode, valve 102 closed and the pressurized air 142 inside tank 122 is continuing to expand while its pressure is decreasing and its volume increasing until approximately all the water in tank 122 has been passed through the hydro turbine 123 to tank 121, at which time, valve 104 will be opened, and lets the excess pressurized air in tank 122 to be released to the atmosphere. At this time, the system is ready to start the third phase and then the fourth phase which are identical to the first phase and the second phase respectively, with opposite roles of the tanks 121 and 122.

Important points in reference of the above description:

About 10% of the energy which is storage in the pressurized air is wasted by releasing the remained pressurized air to the open atmosphere, but in comparison to other methods, it is still very efficient. The pressure of the releasing air to the atmosphere can be adjusted by adjusting the volume of pressurized air at which valve 102 is closed at the end of the first phase that is described above, for example if valve 102 will be closed when 5% of the inner volume of 122 is filled with pressurized air, the amount of energy that will be wasted is 5%, but then the average output power of the system will be lower.

The pump and electrical motor unit can be completely independent from the hydro turbine generator unit, the reason for using reversible hydro-generator-pump as one unit is the cost of the system, which can be lowered by using the described combination.

Figure 7:
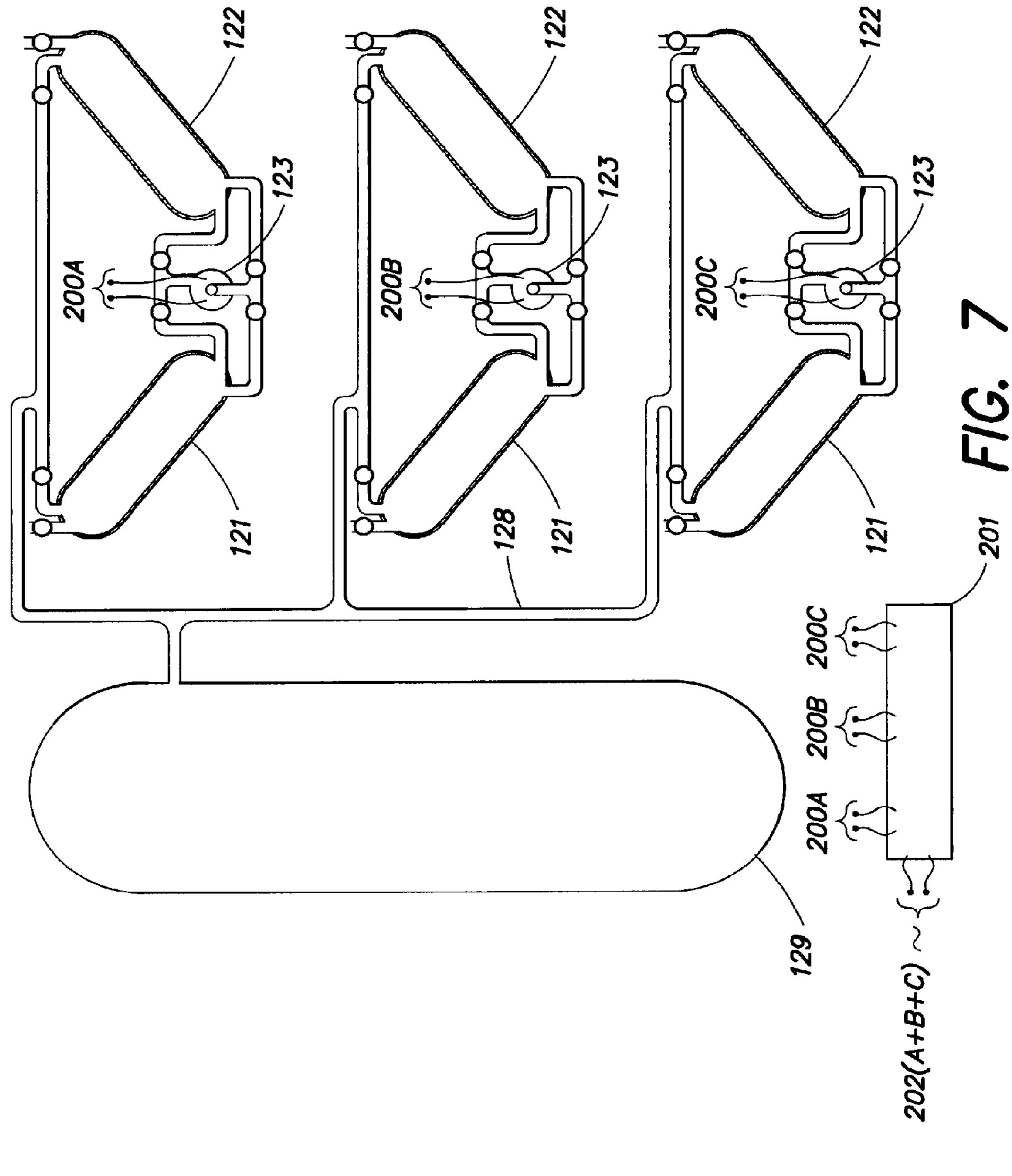
FIG. 7 shows a system that includes multiple sub systems in order to achieve a higher and smoother output of power from the system.

FIG. 7 is a drawing showing another version of the system of the present invention for converting pressurized air energy into electricity.

In FIG. 7, reference numeral 129 is a pressurized air reservoir which is commonly connected to three sub system A, B, and C, each one of them is identical to the turbine generator and tanks section of the system described above in FIG. 5 and FIG. 6.

Reference numerals 200A, 200B and 200C are the electricity outlet from the generators of each system respectively. Reference numeral 201 is a transforming unit which transforms the individual electricity output of each, subsystem into a common electricity output 202 (A+B+C)

The advantage of this arrangement is that more continuous and uniform electricity output can be produced when plurality of the subsystems are connected and operated synchronically.

Figure 8:
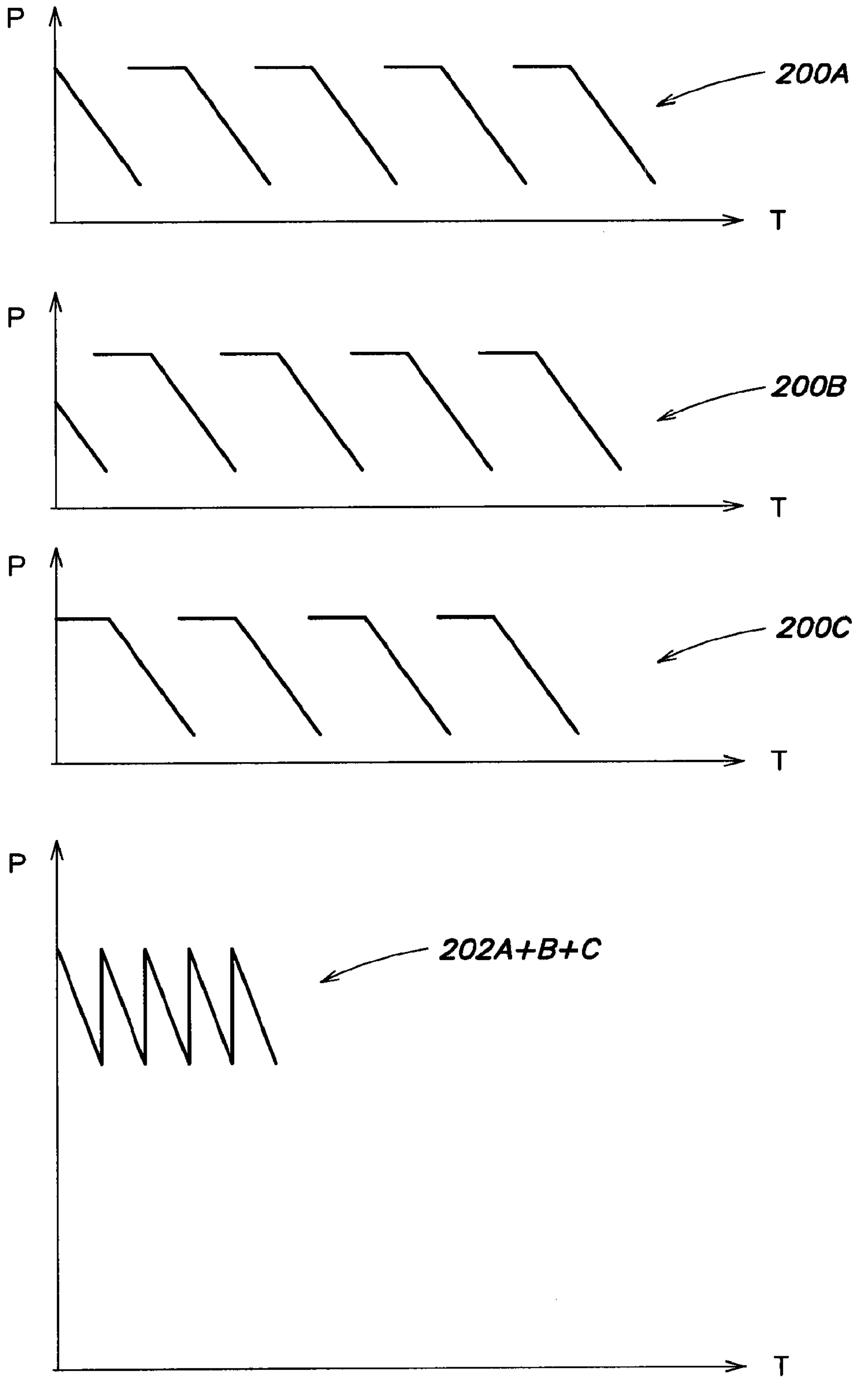
FIG. 8 shows the power versus time in each one of the sub system in electricity producing mode of the system, and the power versus time diagram of the combined system.

FIG. 8 shows three graphs of power output at 200A, 200B and 200C, versus time of each of the subsystems shown in FIG. 7.

The lower graph shows the total combined power output: 202 (A+B+C) which represent the sum of the electricity power of all three subsystems versus time.

It is to be understood that the present invention is not limited to the embodiments described above, but include any and all embodiments within the scope of the claims and the ideas of the present invention.

While the invention has been described above with respect to specific apparatus and specific methodical implementations, it should be clear that various modifications and alteration can be made and various features of one embodiment can be included in other embodiments within the scope of the present invention.

The invention claimed is:

1. A system for converting electrical energy into pressurized air that can be stored, comprising:
- a pump-motor section comprising:
  - a pump having an inlet and an outlet; and
  - an electrical motor;
- a pressurized air reservoir;
- a first tank and a second tank having approximately the same inner volume; and
- controllable valves that enable the first and second tanks to be connected or disconnected independently to the inlet and the outlet of the pump, to the open atmosphere and to the pressurized air reservoir;
- the first and second tanks containing together a total volume of liquid that is approximately equal to the inner volume of one of the first and second tanks;
- the system operating such that when the pump is operating, liquid is pumped from the first tank into the second tank, and causes the air pressure in the second tank to increase to a point at which it is approximately equal to the pressure inside the pressurized air reservoir, and
- wherein at this equilibrium pressure status, one of the valves is opened and allows pressurized air to flow from the second tank into the pressurized air reservoir;
- when approximately all of the air in the second tank has been passed to the pressurized air reservoir, and the second tank is approximately full of liquid, the position of the valves is changed to a position wherein the first and second tanks will have opposite roles,
- whereby the system can operate reciprocally and continuously to convert electrical energy into pressurized air that can be storage in the pressurized air reservoir, while the roles of the first and second tanks are changing and are opposite in each cycle.

2. The system of claim 1, wherein the liquid is oil.

3. The system of claim 1, wherein the first and second tanks are thermally isolated from their surroundings.

4. The system of claim 1, further comprising a non-electrical motor that drives the pump.

5. The system of claim 1, wherein the pump of the pump-motor section is convertible into a hydro turbine and the motor of the pump-motor section is convertible into a hydro generator.

6. The system of claim 1, wherein the liquid is water.

7. The system of claim 1, wherein the liquid is any liquid other than water.

8. The system of claim 1, wherein the pump of the pump-motor section is not convertible into a hydro turbine and the motor of the pump-motor section is not convertible into a hydro generator.

9. A method for producing electricity from pressurized air, comprising:
- providing a pump-motor section that can be converted into a hydro turbine and into a hydro generator that is driven by the hydro turbine, the hydro turbine including an inlet and an outlet;
- providing a pressurized air reservoir;
- providing a first tank and a second tank that have approximately the same inner volume; and
- providing controllable valves that enable the first and second tanks to be connected or disconnected independently to the inlet and the outlet of the hydro turbine, to the open atmosphere and to the pressurized air reservoir;
- the first and second tanks containing together a total volume of liquid which is approximately equal to the inner volume of one of the first and second tanks;
- starting an operational process of converting pressurized air into electricity by introducing liquid into the first tank until the first tank is approximately full of liquid and then opening the valves that connects the first tank to the pressurized air reservoir and the first tank to the inlet of the turbine such that the pressurized air pushes the liquid in the first tank into the inlet of the turbine causing the hydro turbine to rotate and drive the generator to produce electricity, the liquid flowing from an outlet of the turbine into the second tank whose inner volume is connected to the open atmosphere;
- disconnecting the first tank from the pressurized air reservoir when a portion of the inner volume of the first tank is full with pressurized air, the pressurized air in the first tank expanding until the first tank is approximately full with air and the second tank is approximately full with liquid; and then
- at this point, changing the position of the controlled valves to a position wherein the roles of the first and second tanks are reversed and the operation continues reciprocally continuously while the position of the controlled valves are changing the role of the first and second tanks in each and every cycle.

10. The method of claim 9, wherein the first tank is disconnected from the pressurized air reservoir when approximately 10% of the inner volume of the first tank is full with pressurized air.

11. The method of claim 9, wherein the first tank is disconnected from the pressurized air reservoir when less than 10% of the inner volume of the first tank is full with pressurized air.

12. The method of claim 9, wherein the turbine and the generator are independent of one another.

13. The method of claim 9, wherein the liquid is oil or another liquid that is not water.

14. A method for converting pressurized air energy into electricity comprising providing a plurality of systems including the pump-motor section, first and second tanks and controllable valves as set forth in claim 9, and coupling the pressurized air reservoir to the first and second tanks of each system such that the pressurized air reservoir is common to all of the systems.

15. The method of claim 14, wherein all the systems operate simultaneously in order to produce higher and more uniform electricity power.

16. The method of claim 9, wherein the liquid is water.

* * * * *